United States Patent
Endel et al.

(10) Patent No.: US 9,507,344 B2
(45) Date of Patent: Nov. 29, 2016

(54) INDEX GENERATION AND EMBEDDED FUSION FOR CONTROLLER PERFORMANCE MONITORING

(71) Applicant: Honeywell International Inc., Morristown, NJ (US)

(72) Inventors: Petr Endel, Ostrava (CZ); Karel Marik, Revnice (CZ)

(73) Assignee: Honeywell International Inc., Morris Plains, NJ (US)

( * ) Notice: Subject to any disclaimer, the term of this patent is extended or adjusted under 35 U.S.C. 154(b) by 771 days.

(21) Appl. No.: 13/891,312

(22) Filed: May 10, 2013

(65) Prior Publication Data

US 2014/0336787 A1    Nov. 13, 2014

(51) Int. Cl.
*G06F 19/00* (2011.01)
*G05B 23/02* (2006.01)

(52) U.S. Cl.
CPC ....... *G05B 23/0286* (2013.01); *G05B 23/0235* (2013.01)

(58) Field of Classification Search
USPC ......... 700/43, 28, 41, 81, 108, 276
See application file for complete search history.

(56) References Cited

U.S. PATENT DOCUMENTS

| | | | | |
|---|---|---|---|---|
| 4,038,531 A * | 7/1977 | Loe, Jr. | ........... | B27N 3/146 141/83 |
| 5,920,478 A * | 7/1999 | Ekblad | ........... | G05B 11/32 318/139 |
| 2005/0096758 A1 * | 5/2005 | Takezawa | ........... | G05B 13/048 700/44 |
| 2005/0171626 A1 * | 8/2005 | Schwarm | ........... | G05B 23/0294 700/108 |
| 2008/0071395 A1 * | 3/2008 | Pachner | ........... | G05B 13/048 700/34 |
| 2009/0138102 A1 * | 5/2009 | Moden | ........... | G05B 13/048 700/37 |
| 2009/0198350 A1 * | 8/2009 | Thiele | ........... | G05B 13/042 700/30 |
| 2010/0204808 A1 * | 8/2010 | Thiele | ........... | G05B 17/02 700/30 |
| 2012/0116546 A1 | 5/2012 | Sayyar-Rodsari | | |

FOREIGN PATENT DOCUMENTS

| | | |
|---|---|---|
| GB | 2363211 A | 12/2001 |
| GB | 2471758 A | 1/2011 |

OTHER PUBLICATIONS

Lennart Ljing, Presication Error Estimation Methods, Linkoping Univ,. Sweden, Oct. 3, 2001, p. 1-11.*
Seborg. et al. , Adaptive Control Strategies for Process Control A Survey, , Jun. 1986, Univ. of Califrnia, Dept. of Engineering, vol. 32, No. 6, p. 881-913.*
Karl Johan, PID Control, 2002, by Karl Hohan, p. 219-251.*

(Continued)

*Primary Examiner* — Kidest Bahta
(74) *Attorney, Agent, or Firm* — Schwegman Lundberg & Woessner, P.A.

(57) ABSTRACT

A system calculates a first ratio of a prediction error variance of a model of a controller error, and the lesser of a variance of a prediction error of a naïve predictor model and a variance of a controller error. The system rates a process controller as a function of the first ratio. The system also calculates a second ratio of a variance of the controller error and a variance of the prediction error of the naïve predictor model. The system rates the process controller a function of the second ratio. The system uses the first ratio, second ratio, other ratios, and discrete indicators in determining an embedded fusion for loop performance monitoring in the process controller and for displaying a value as a measure of the loop performance.

14 Claims, 6 Drawing Sheets

(56) References Cited

OTHER PUBLICATIONS

"United Kingdom Application Serial No. 1407381.1, Response filed Apr. 30, 2015 to Combined Search and Examination Report mailed Dec. 9, 2014", 7 pgs.

"United Kingdom Application Serial No. 1407381.1, Combined Search and Examination Report mailed Dec. 9, 2014", 7 pgs.

"United Kingdom Application Serial No. 1407381.1, Combined Search and Examination Report mailed Oct. 19, 2015", 6 pgs.

"United Kingdom Application Serial No. 1407381.1, Office Action mailed Jul. 27, 2015", 2 pgs.

"United Kingdom Application Serial No. 1407381.1, Response filed Sep. 25, 2015 to Office Action mailed Jul. 27, 2015", 3 pgs.

Harris, Thomas J, et al., "A review of performance monitoring and assessment techniques for univariate and multivariate control systems", Journal of Process Control, 9(1), (Feb. 1999), 1-17.

Harris, Thomas J, "Assessment of control loop performance", The Canadian Journal of Chemical Engineering, 67(5), (Oct. 1989), 856-861.

Horch, A., et al., "A modified index for control performance assessment", Journal of Process Control, 9(6), (Dec. 1999), 475-483.

Thornhill, N. F, et al., "Refinery-wide control loop performance assessment", Journal of Process Control, 9(2), (Apr. 1999), 109-124.

* cited by examiner

INDEX GENERATION AND EMBEDDED FUSION FOR CONTROLLER PERFORMANCE MONITORING

TECHNICAL FIELD

The present disclosure relates to index generation and embedded fusion for controller performance monitoring, and in an embodiment, but not by way of limitation, generation of a predictability index and a fluctuation index for controller performance monitoring, and an embedded fusion for loop performance monitoring.

BACKGROUND

Common heating, ventilation, and air conditioning (HVAC) control projects (in particular, setting up the controllers, and in most cases, tuning proportional gain and integral time—so called PI constants of controller) are characterized by: 1) little time for manual tuning, 2) installers that are not control engineers, 3) seasonal differences—loops tuned during one season could perform poorly during another season, 4) non-linear plants causing poor control at some operating points, 5) and significant disturbances in the system. As a result, control loops are often not properly tuned for some set of operating points. User comfort is consequently often violated, energy is wasted, and/or actuators are worn out. Because of this, there is need to monitor control after installation and provide information, alerts, and prioritization of instances in which the control quality has deteriorated or when the actuators do not behave in a standard way (e.g., stiction, backlash, etc.).

DETAILED DESCRIPTION

Figure 1:
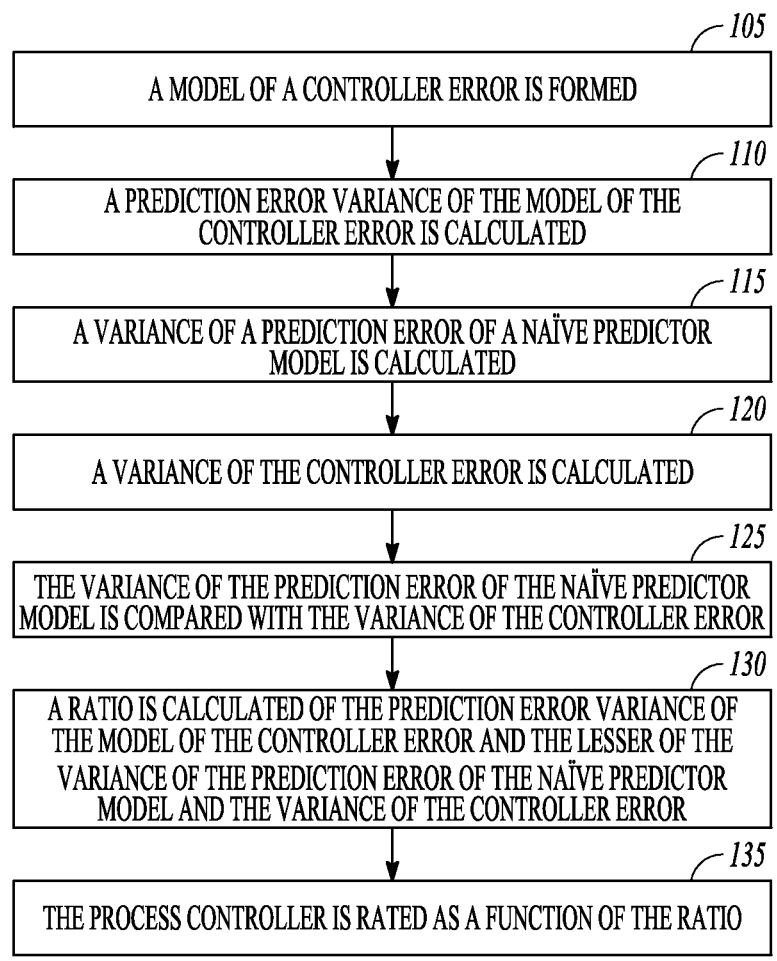
FIG. 1 is a flowchart of example operations and features of generating a predictability index.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

As noted above, controller performance monitoring normally involves methods to assess the quality of control, or in a broader sense to assess loop performance, including disturbances acting on the loop or potential actuator malfunctions (e.g., stiction-static friction in the actuators). The 'quality of control' assessment includes detection of too aggressive control (there is significant overshoot, which in the case of an HVAC system causes energy wastage), sluggish control (the response of the control is too slow), an offset (i.e., not meeting the setpoint, causing discomfort in case of HVAC temperature control), or oscillations (causing energy wastage and wearing out of actuators).

To address these issues, in an embodiment, indicators (indices) are defined, which are used to detect undesired behavior of the loop. Automatic detection of this undesired behavior has a direct impact on the maintenance efficiency. The isolation and elimination of the undesired behavior reduces energy consumption, prevents the actuators from wearing out, and/or improves the comfort. For maintenance purposes, it is helpful to present the overall performance of the loop at a given time instant in an easily comprehensible way, i.e., to represent all the indices by one number. This quantity can be used for quick comparison between different loops and for prioritizing the loops for maintenance. The evaluation of the quantity, as well as the evaluation of the indices, should be done at the lowest level (controller level) to prevent extensive data transfers and storage.

Predictability Index

An embodiment generates a Predictability Index that provides a way to automatically detect poor control (i.e., high predictability of the controller error) on the controller level. This is done with low memory requirements. Connected with an automated tuning mechanism, this embodiment saves time of the service engineer and ensures quality of control even when operation conditions change. When connected with supervisory software, this embodiment helps to prioritize loops for maintenance.

The main idea of the control assessment using Predictability Index is that the controller error (the difference between setpoint and process variable) in the ideal case should be white noise, which means that the controller error should not be predictable. When the controller error is predictable, the prediction could be incorporated into the control in order to improve the control. In prior systems, a ratio of minimum error variance and actual error variance (taken as mean square error) is formed in order to assess the control quality. The minimum error variance is computed as the prediction error variance of a model of controller error (AutoRegressive (AR) or AutoRegressive Moving Average (ARMA) model). The actual error variance computed by mean squared error incorporates the offset of the error.

In contrast, in an embodiment of the present disclosure, the embodiment focuses directly (and only) on the predictability of the controller error, not on the offset part. In situations when the controller output is not saturated, the model of the controller error (AR or ARMA model) is formed and its "quality" (measured by prediction error variance) is compared to two dummy models and their prediction error variances. The first dummy model is the naïve predictor, and the second dummy model takes the mean as the prediction (so that its prediction error variance is in fact the controller error variance). From those two dummy models, the one with lower prediction error variance is selected for comparison. Thus the ratio is formed as prediction error variance of the model of controller error divided by the minimum of naïve predictor error variance and controller error variance. The ratio is subtracted from 1, so that poor control has a Predictability Index close to one. In another embodiment, the system can be set up so that poor control has a Predictability Index close to zero. This embodiment detects regular patterns in controller error, that is, ramps and oscillations. It intentionally does not include offset, so as to be able to distinguish those poor control scenarios.

In the Predictability Index embodiment, the only inputs to the algorithm are a process variable, setpoint (e.g., room temperature (process variable) and its setpoint), and the controller output (e.g., heating valve command). The output is the normalized Predictability Index. The threshold for an unacceptable value of the index (e.g., 90th percentile estimate) could be set from historical data, or through an online estimate using quantile regression. The Predictability Index presents a way to assess the control in real time, in an embedded environment (i.e., directly in the controller). The algorithm itself is recursive and simple, so that the memory requirements and computational power needed are low. This control assessment represents a simple indicator of control quality. The control assessment can be used for triggering an alarm if the threshold is exceeded, for a comparison between controllers (prioritization of loops for maintenance), or as a trigger for an automated tuning mechanism.

FIG. 1 is a flowchart of example operations and features of generating a Predictability Index. FIG. 1 includes a number of process blocks 105-135. Though arranged serially in the example of FIG. 1, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 1, at 105, a model of a controller error is formed. At 110, a prediction error variance of the model of the controller error is calculated. At 115, a variance of a prediction error of a naïve predictor model is calculated. At 120, a variance of the controller error is calculated. At 125, the variance of the prediction error of the naïve predictor model is compared with the variance of the controller error. At 130, a ratio is calculated of the prediction error variance of the model of the controller error and the lesser of the variance of the prediction error of the naïve predictor model and the variance of the controller error. At 135, the process controller is rated as a function of the ratio.

Figure 2:
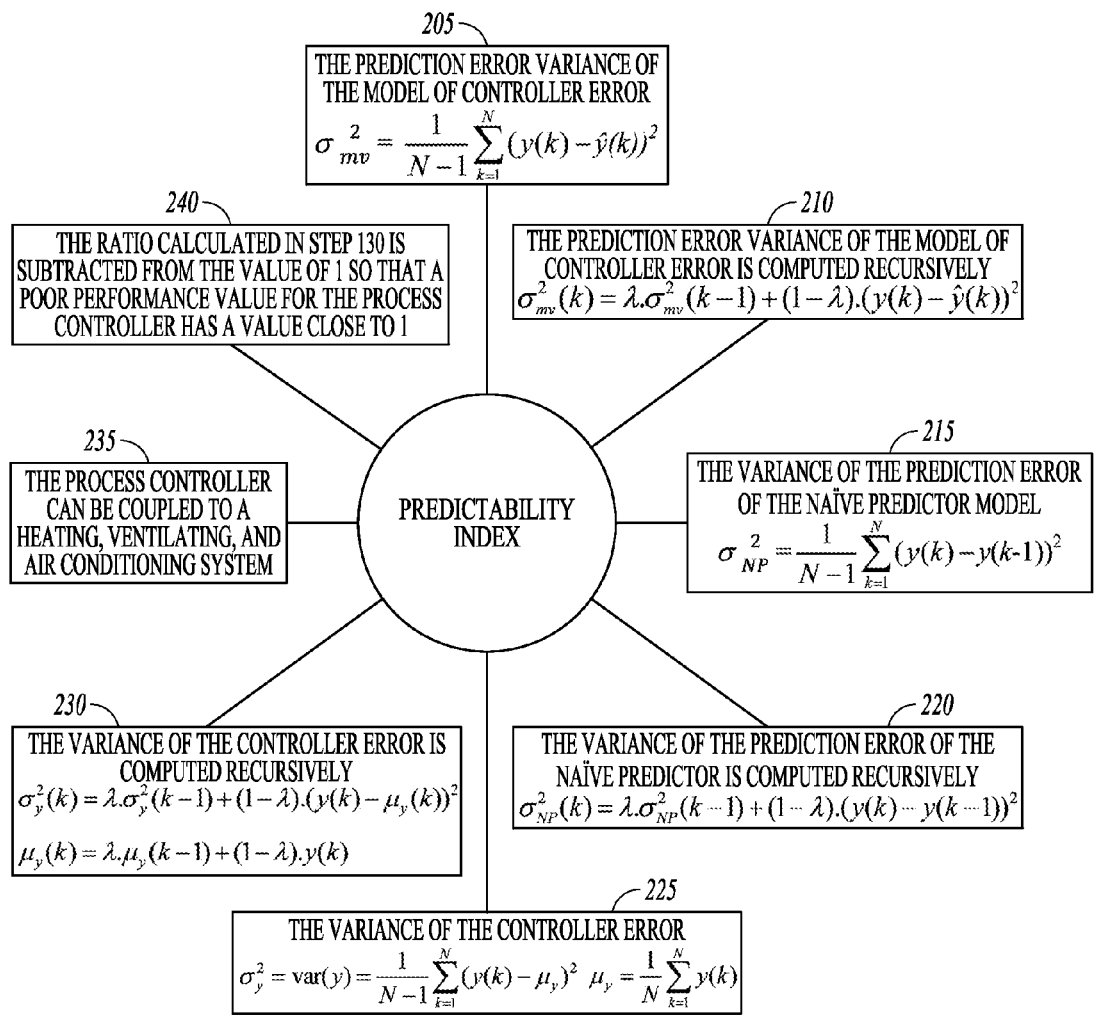
FIG. 2 is a block diagram illustrating additional details and features of the predictability index embodiment.

FIG. 2 is a block diagram illustrating additional details and features of the Predictability Index embodiment. Block 205 illustrates that the prediction error variance of the model of controller error can be represented as follows:

$$\sigma_{mv}^2 = \frac{1}{N-1}\sum_{k=1}^{N}(y(k)-\hat{y}(k))^2 \qquad \text{Equation No. 1}$$

In Equation No. 1, N is a number of process variable samples, y(k) is a controller error value at sample k (the controller error value is determined by subtracting a process variable from a setpoint), and ŷ(k) is the controller error value predicted by the model of the controller error at sample k.

Block 210 illustrates that the prediction error variance of the model of controller error at sample k can be computed recursively as follows:

$$\sigma_{mv}^2(k)=\lambda \cdot \sigma_{mv}^2(k-1)+(1-\lambda)\cdot(y(k)-\hat{y}(k))^2 \qquad \text{Equation No. 2}$$

In Equation No. 2, λ is a forgetting factor of an exponential forgetting, and $\sigma_{mv}^2(k-1)$ is the prediction error variance of the model of controller error at sample k-1.

Block 215 illustrates that the variance of the prediction error of the naïve predictor model can be represented by:

$$\sigma_{NP}^2 = \frac{1}{N-1}\sum_{k=1}^{N}(y(k)-y(k-1))^2 \qquad \text{Equation No. 3}$$

In Equation No. 3, N is a number of process variable samples, y(k) is a controller error value at sample k (the controller error value is determined by subtracting a process variable from a setpoint), and y(k-1) is a controller error value at sample k-1

Block 220 illustrates that the variance of the prediction error of the naïve predictor model at sample k can be calculated recursively as follows:

$$\sigma_{NP}^2(k)=\lambda \cdot \sigma_{NP}^2(k-1)+(1-\lambda)\cdot(y(k)-y(k-1))^2 \qquad \text{Equation No. 4}$$

In Equation No. 4, λ is a forgetting factor of an exponential forgetting, and $\sigma_{NP}^2(k-1)$ is the variance of the prediction error of the naïve predictor model at sample k-1.

Block 225 illustrates that the variance of the controller error can be represented as follows:

$$\sigma_y^2 = \text{var}(y) = \frac{1}{N-1}\sum_{k=1}^{N}(y(k)-\mu_y)^2 \qquad \text{Equation No. 5}$$

In Equation No. 5, N is a number of process variable samples, y(k) is a controller error value at sample k (the controller error value is determined by subtracting a process variable from a set point), and $\mu_y$ is an arithmetic mean value of the controller error, $$\mu_y = \frac{1}{N}\sum_{k=1}^{N}y(k).$$

Block 230 illustrates that the variance of the controller error at sample k can be computed recursively as follows:

$$\sigma_y^2(k)=\lambda \cdot \sigma_y^2(k-1)+(1-\lambda)\cdot(y(k)-\mu_y(k))^2 \qquad \text{Equation No. 6}$$

In Equation No. 6, λ is a forgetting factor of an exponential forgetting, $\sigma_y^2(k-1)$ is the variance of the controller error at sample k-1, and $\mu_y(k)$ is an arithmetic mean value at sample k computed recursively as follows:

$$\mu_y(k)=\lambda \cdot \mu_y(k-1)+(1-\lambda)\cdot y(k).$$

Block 240 illustrates that the ratio calculated in step 130 can be subtracted from the value of 1 so that a poor performance value for the process controller has a value close to 1. Block 235 illustrates that the process controller can be coupled to a heating, ventilating, and air conditioning system.

Fluctuation Index

The Fluctuation Index embodiment provides a way to automatically detect fluctuations (high frequency quasi-periodic behavior with low amplitudes) in controller output, which can cause extensive wear of the actuators (e.g., heating and cooling valves in case of HVAC temperature control). The Fluctuation Index embodiment provides alerts and/or prioritization, so it improves efficiency of maintenance. While connected to an automated tuning mechanism, the embodiment prevents undesired behavior. In both cases, the embodiment prolongs the lifetime of actuators and cuts the costs of maintenance.

Prior systems use simple measures of controller output (e.g., strokes per day, monitoring the events of controller output reversals, or other heuristic measures), where the threshold for undesired behavior is often hard to determine. The Fluctuation Index embodiment provides a normalized index. It is formed as the ratio between controller error variance and naïve predictor error variance (in fact the variation of difference between successive values of controller error). The ratio can be subtracted from 1, so that the undesired situation has a value of the Fluctuation Index close to one. In another embodiment, the system can be set up so that undesired situation has a Fluctuation Index close to zero.

Similar to the Predictability Index, the only inputs to the algorithm are a process variable and setpoint (e.g., room temperature and its setpoint) and the controller output (e.g., heating valve command) The output is the normalized Fluctuation Index. The threshold for an unacceptable value of the index (e.g., 90th percentile estimate) could be set from historical data, or through an online estimate using quantile regression. The Fluctuation Index provides a way to assess the control in real time, in an embedded environment (directly in the controller). The algorithm itself is recursive and simple, so that the memory requirements and computational power needed are low. This control assessment provides a simple indicator, which can be used for triggering an alarm if the threshold is exceeded, for comparison between controllers (prioritization of loops for maintenance), or as a trigger to an automated tuning mechanism.

Figure 3:
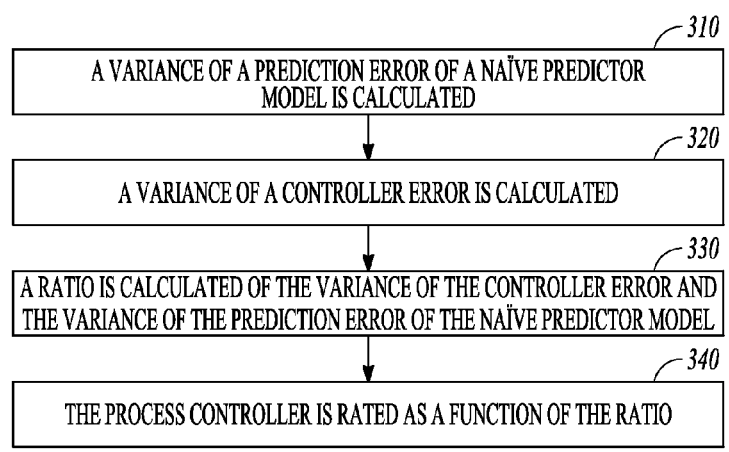
FIG. 3 is a flowchart of example operations and features of generating a fluctuation index.

FIG. 3 is a flowchart of example operations and features of generating a Fluctuation Index. FIG. 3 includes a number of process blocks 310-340. Though arranged serially in the example of FIG. 3, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 3, at 310, a variance of a prediction error of a naïve predictor model is calculated. At 320, a variance of a controller error is calculated. At 330, a ratio is calculated of the variance of the controller error and the variance of the prediction error of the naïve predictor model. At 340, the process controller is rated as a function of the ratio.

Figure 4:
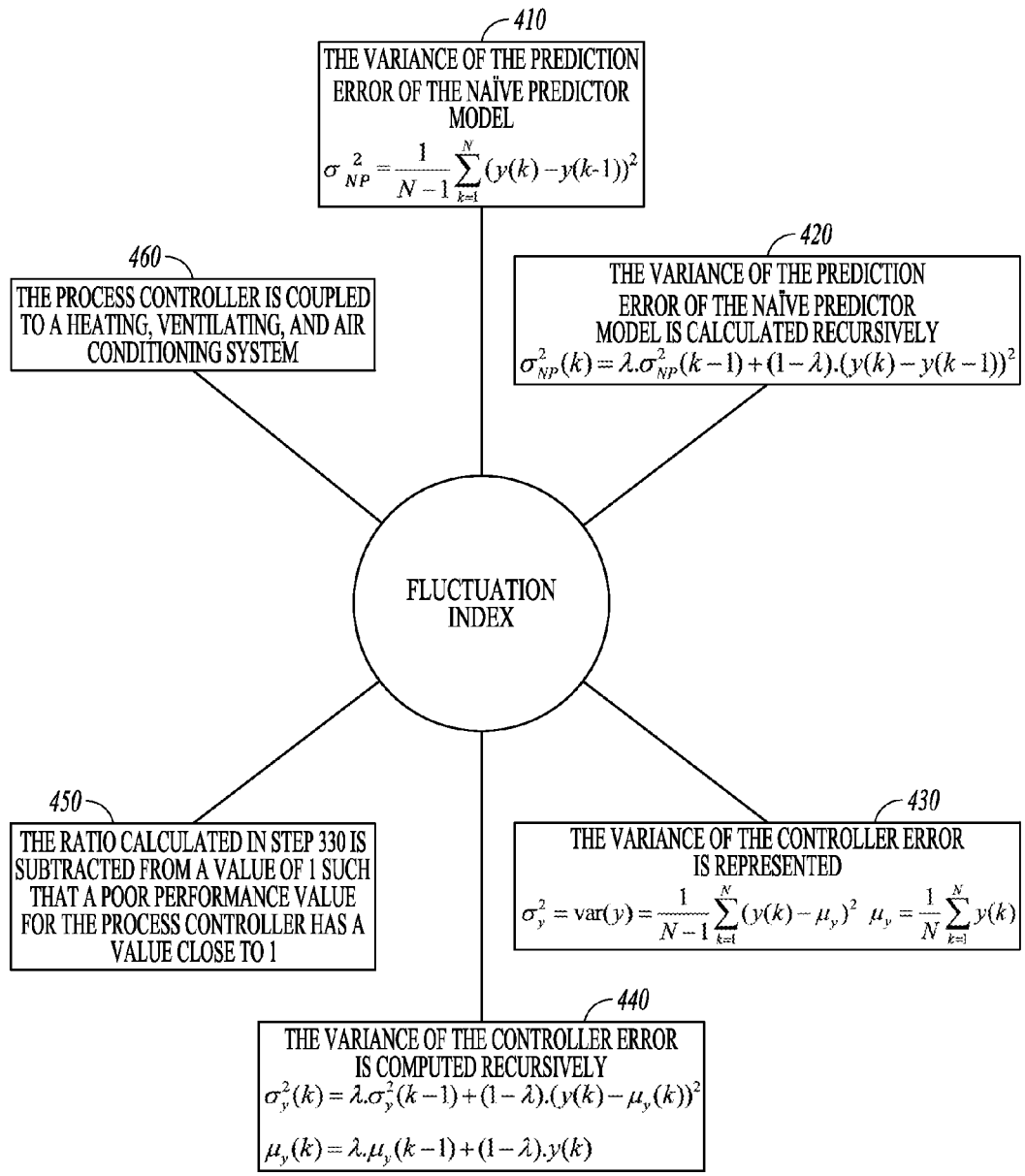
FIG. 4 is a block diagram illustrating additional details and features of the fluctuation index embodiment.

FIG. 4 is a block diagram illustrating additional details and features of the Fluctuation Index embodiment. Block 410 illustrates that variance of the prediction error of the naïve predictor model can be calculated as follows:

$$\sigma_{NP}^2 = \frac{1}{N-1}\sum_{k=1}^{N}(y(k)-y(k-1))^2 \qquad \text{Equation No. 7}$$

In Equation No. 7, N is a number of process variable samples, y(k) is a controller error value at sample k (the controller error value is determined by subtracting a process variable from a setpoint), and y(k−1) is a controller error value at sample k−1.

Block 420 illustrates that the variance of the prediction error of the naïve predictor model at sample k can be calculated recursively as follows:

$$\sigma_{NP}^2(k)=\lambda\cdot\sigma_{NP}^2(k-1)+(1-\lambda)\cdot(y(k)y(k-1))^2 \qquad \text{Equation No. 8}$$

In Equation No. 8, $\lambda$ is a forgetting factor of an exponential forgetting, and $\sigma_{NP}^2$, (k−1) is the variance of the prediction error of the naïve predictor model at sample k−1.

Block 430 illustrates that the variance of the controller error can be represented as follows:

$$\sigma_y^2 = \text{var}(y) = \frac{1}{N-1}\sum_{k=1}^{N}(y(k)-\mu_y)^2 \qquad \text{Equation No. 9}$$

In Equation No. 9, N is a number of process variable samples, y(k) is a controller error value at sample k (the controller error value is determined by subtracting a process variable from a setpoint), and $\mu_y$ is an arithmetic mean value of the controller error, $$\mu_y = \frac{1}{N}\sum_{k=1}^{N}y(k).$$

Block 440 illustrates that the variance of the controller error at sample k can be computed recursively as follows:

$$\sigma_y^2(k)=\lambda\cdot\sigma_y^2(k-1)+(1-\lambda)\cdot(y(k)-\mu_y(k))^2 \qquad \text{Equation No. 10}$$

In Equation No. 10, $\lambda$ is a forgetting factor of an exponential forgetting, $\sigma_y^2(k-1)$ is the variance of the controller error at sample k−1, and $\mu_y(k)$ is an arithmetic mean value at sample k computed recursively as follows:

$$\mu_y(k)=\lambda\cdot\mu_y(k-1)+(1-\lambda)\cdot y(k).$$

Block 450 illustrates that the ratio calculated in step 330 can be subtracted from a value of 1 such that a poor performance value for the process controller has a value close to 1. Block 460 illustrates that the process controller can be coupled to a heating, ventilating, and air conditioning system.

Embedded Fusion

Figure 5:
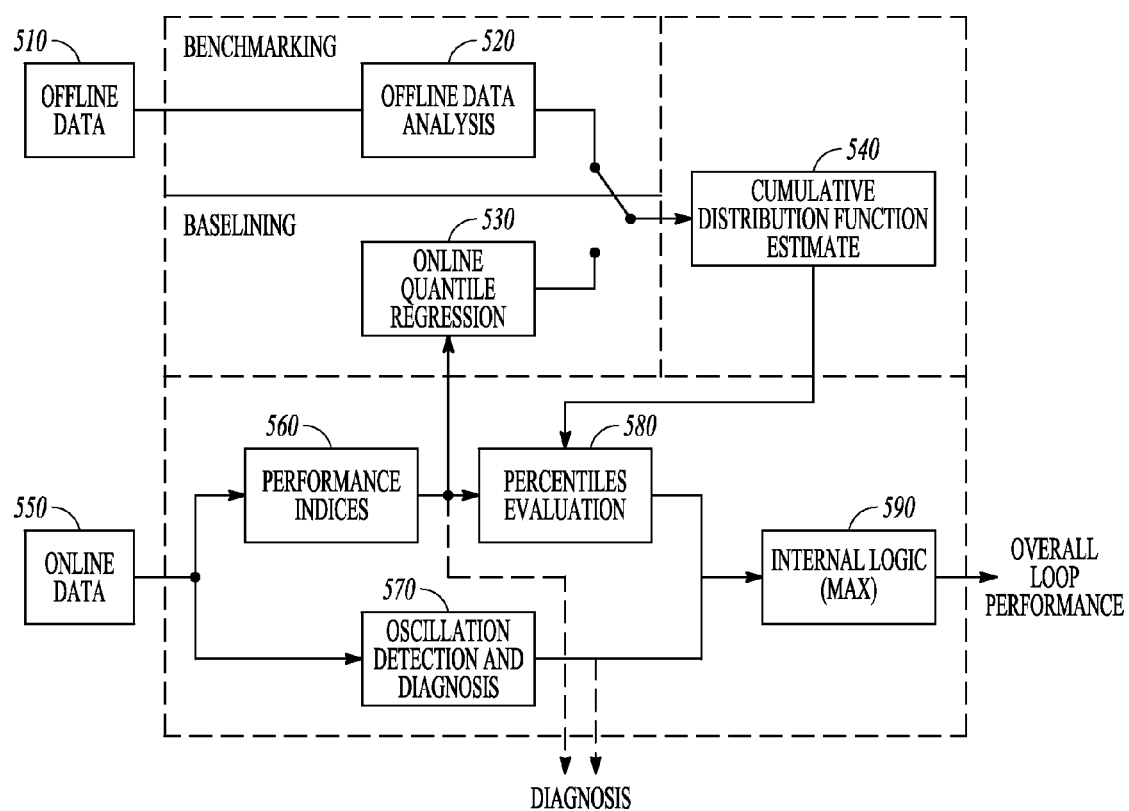
FIG. 5 is a block diagram of a system for determining embedded fusion.

The embedded fusion embodiment provides a scheme and logic used for fusion of indices' data (e.g., Predictability and Fluctuation Indices) in order to represent the overall performance of the loop as one value. A block diagram of a system for determining embedded fusion is illustrated in FIG. 5. The embodiment can work with offline data 510 or online data 550. The indices in general can be represented by continuous values (normalized or not normalized) or discrete values—e.g., binary indicators of oscillation or binary indicators of the cause of oscillation for poor tuning, stiction, or disturbance. Following the proposed scheme, continuous values of performance indices 560 are transformed to percentile values 580 using a cumulative distribution function estimate 540. The cumulative distribution function can be estimated using historical data during offline pre-processing of data 520 (it can contain data from various controllers to provide overall benchmarking), or estimated online using quantile regression 530 (taking into account data only from particular controller-baselining). The cumulative distribution function estimate 540 can be simplified using representation by piecewise linear function. The discrete values of the performance indices are transformed into the range of percentiles (that is, into the interval between 0 and 100)—e.g., values 0 and 100 are assigned to the binary indicators of oscillation or binary indicators of the cause of oscillation (570).

After this step, the percentile for each continuous index is obtained (560, 580) and the transformed value for each discrete index is obtained (570). Those percentiles together with transformed discrete indices are inputs to internal logic 590 of the fusion. In the internal logic 590 after the evaluation of discrete indices considering the internal or external cause, the maximum value of all indices (both continuous and transformed discrete) is taken as the overall loop performance measure. Following this simple logic, a value of loop performance measure higher than the threshold (e.g., 90 for $90^{th}$ percentile threshold) means unacceptable behavior of the loop-oscillation due to internal causes or exceeding the threshold for at least one performance index.

The proposed scheme and logic can be used for performance monitoring on the controller level, with arbitrary performance indices. The algorithm uses estimates of cumulative distribution functions obtained from offline analysis (which has to be performed once, before the launch) or from online estimation. The scheme and internal logic is simple, so the algorithm has low overhead and can be easily embedded into controller or performed online. The overall loop performance indicator can be sent along with selected sampling time to upper layers, where supervisory software operates (e.g., IQeye by Trend Controls), or it can be displayed in the software connected to the controller (e.g., System Engineering Tool by Trend Controls) to provide a quick reference for service engineers and maintenance.

Figure 6:
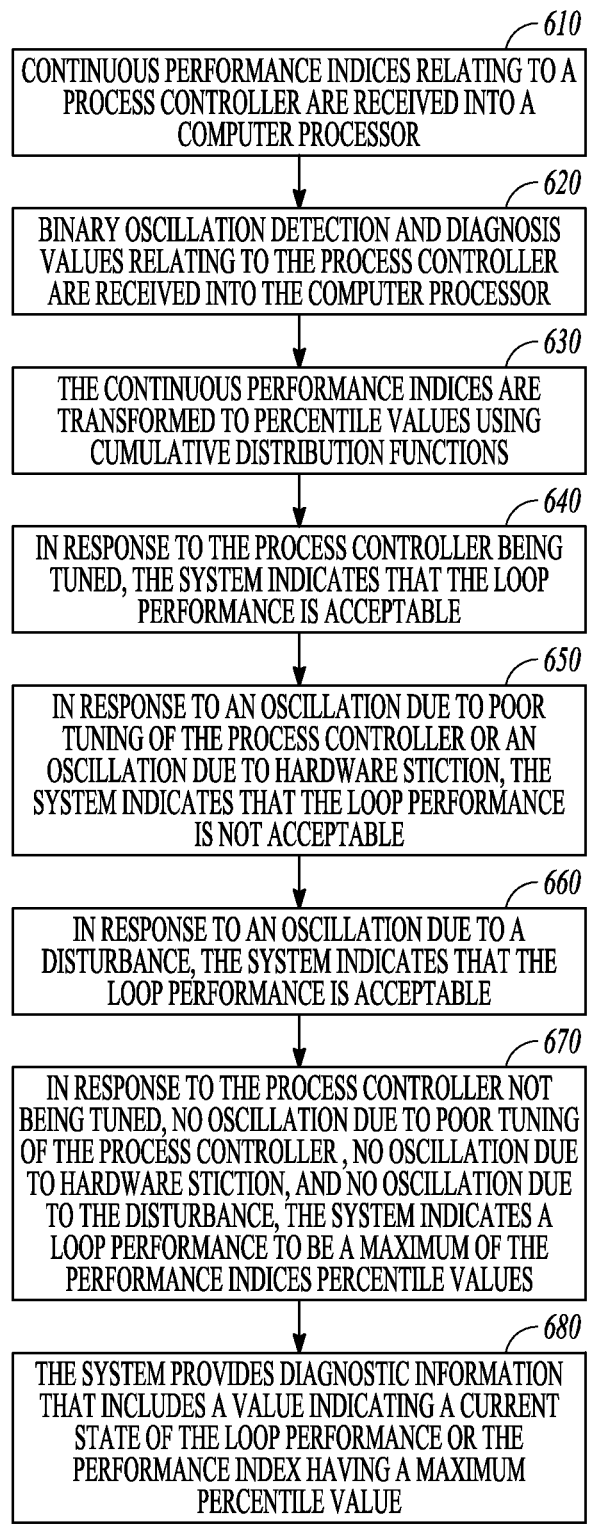
FIG. 6 is a flowchart of an example embodiment of a process for determining embedded fusion.

FIG. 6 is a flowchart of an example embodiment of a process for determining an embedded fusion. FIG. 6 includes a number of process blocks 610-680. Though arranged serially in the example of FIG. 6, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 6, at 610, continuous performance indices relating to a process controller are received into a computer processor. At 620, discrete performance indices (e.g., binary oscillation detection and diagnosis values) relating to the process controller are received into the computer processor. At 630, the continuous performance indices are transformed to percentile values using cumulative distribution function estimates. The cumulative distribution function estimates include a benchmarking of offline historical data of performance indices or a baselining of online data of the performance indices using a quantile regression. As part of internal logic of the fusion 590, at 640, in response to the process controller being tuned, the system indicates that the loop performance is acceptable. At 650, in response to an oscillation due to poor tuning of the process controller or an oscillation due to hardware stiction, the system indicates that the loop performance is not acceptable (loop performance measure equals to 100). At 660, in response to an oscillation due to a disturbance, the system indicates that the loop performance is acceptable. At 670, in response to the process controller not being tuned, to no oscillation due to poor tuning of the process controller, to no oscillation due to hardware stiction, and to no oscillation due to the disturbance, the system indicates a loop performance measure to be a maximum of the continuous performance indices percentile values. At 680, the system provides diagnostic information about the cause of the loop performance measure value (e.g., cause of oscillation or performance index having a maximum percentile value).

Figure 7:
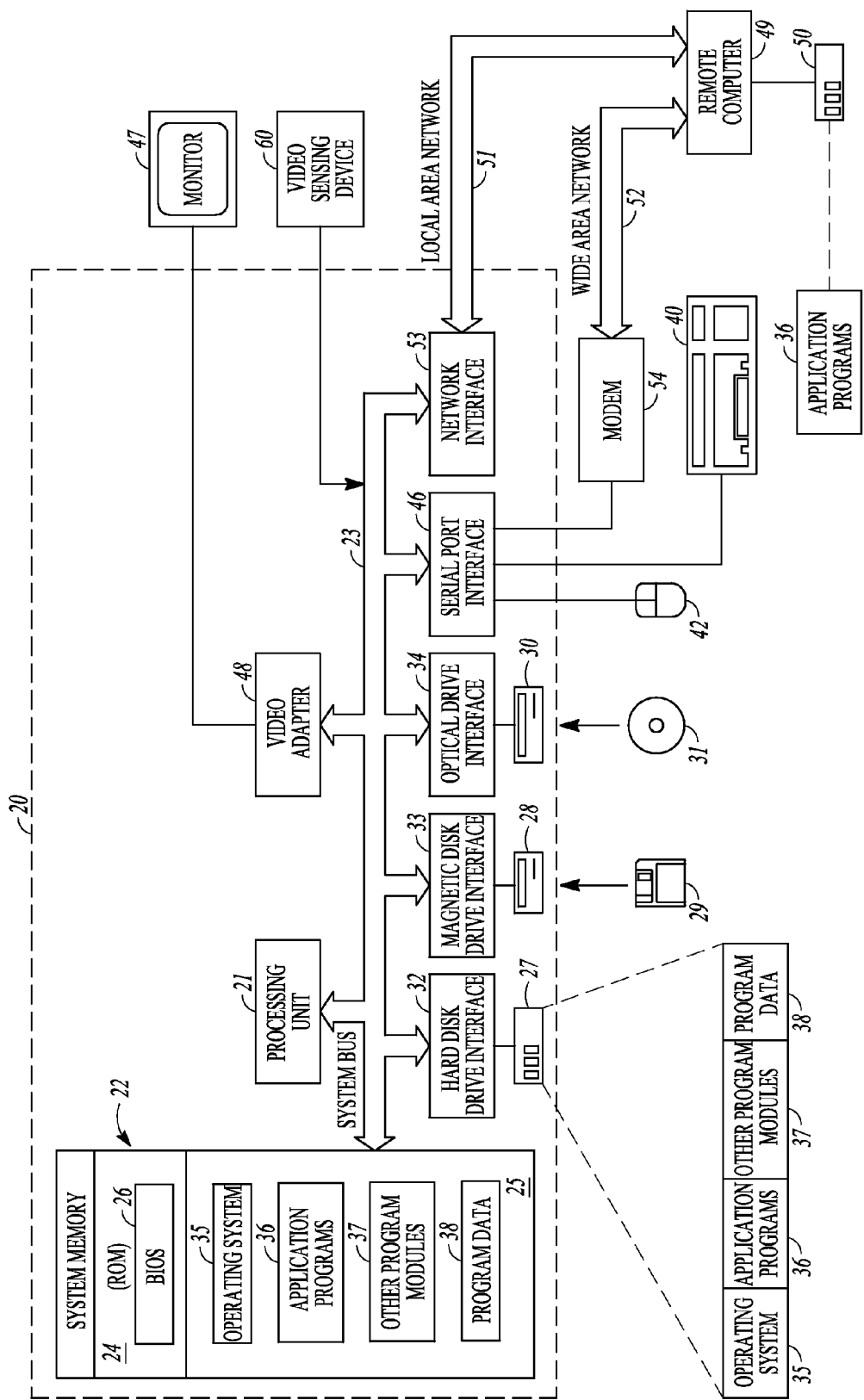
FIG. 7 is a block diagram of a computer system upon which one or more disclosed embodiments can execute.

FIG. 7 is an overview diagram of hardware and an operating environment in conjunction with which embodiments of the invention may be practiced. The description of FIG. 7 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by 10 remote processing devices that are linked through a communications network. In a distributed computing environment, program modules may be located in both local and remote memory storage devices.

In the embodiment shown in FIG. 7, a hardware and operating environment is provided that is applicable to any of the servers and/or remote clients shown in the other Figures.

As shown in FIG. 7, one embodiment of the hardware and operating environment includes a general purpose computing device in the form of a computer 20 (e.g., a personal computer, workstation, controller, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 7 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A heating, ventilation, and air conditioning system comprising:
 a computer processor operable to rate a process controller by:
  forming a model of a controller error;
  calculating a prediction error variance of the model of the controller error;
  calculating a variance of a prediction error of a naïve predictor model;
  calculating a variance of the controller error;
  comparing the variance of the prediction error of the naïve predictor model and the variance of the controller error;
  calculating a ratio of the prediction error variance of the model of the controller error and the lesser of the variance of the prediction error of the naïve predictor model and the variance of the controller error;
  rating the process controller as a function of the ratio; and
  comparing ratings of controllers in order to prioritize loops to maintain and trigger an automated tuning mechanism.

2. The heating, ventilation, and air conditioning system of claim 1, wherein the prediction error variance of the model of controller error comprises:

$$\sigma_{mv}^2 = \frac{1}{N-1}\sum_{k=1}^{N}(y(k)-\hat{y}(k))^2$$

wherein N is a number of process variable samples;
wherein y(k) is a control error value, wherein the control error value is determined by subtracting a process variable from a setpoint; and
wherein ŷ(k) is an error value predicted by the model of the controller error.

3. The heating, ventilation, and air conditioning system of claim 1, wherein the prediction error variance of the model of controller error is computed recursively as follows:

$$\sigma_{mv}^2(k)=\lambda \cdot \sigma_{mv}^2(k-1)+(1-\lambda)\cdot(y(k)-\hat{y}(k))^2$$

wherein $\lambda$ is a forgetting factor of an exponential forgetting; and
wherein $\sigma_{mv}^2(k-1)$ is the prediction error variance of the model of controller error at previous sample.

4. The heating, ventilation, and air conditioning system of claim 1, wherein the variance of the prediction error of the naïve predictor model comprises:

$$\sigma_{NP}^2 = \frac{1}{N-1}\sum_{k=1}^{N}(y(k)-y(k-1))^2$$

wherein N is a number of process variable samples; and
wherein y(k) is a control error value, wherein the control error value is determined by subtracting a process variable from a setpoint.

5. The heating, ventilation, and air conditioning system of claim 1, wherein the variance of the prediction error of the naïve predictor model is calculated recursively as follows:

$$\sigma_{NP}^2(k)=\lambda \cdot \sigma_{NP}^2(k-1)+(1-\lambda)\cdot(y(k)-y(k-1))^2$$

wherein $\lambda$ is a forgetting factor of an exponential forgetting; and
wherein $\sigma_{NP}^2(k-1)$ is the variance of the prediction error of the naïve predictor model at previous sample.

6. The heating, ventilation, and air conditioning system of claim 1, wherein the variance of the controller error comprises:

$$\sigma_y^2 = \text{var}(y) = \frac{1}{N-1}\sum_{k=1}^{N}(y(k)-\mu_y)^2$$

wherein N is a number of process variable samples;
wherein y(k) is a control error value, wherein the control error value is determined by subtracting a process variable from a setpoint; and
wherein $\mu_y$ is an arithmetic mean value of the control error, $$\mu_y = \frac{1}{N}\sum_{k=1}^{N}y(k).$$

7. The heating, ventilation, and air conditioning system of claim 1, wherein the variance of the controller error is computed recursively as follows:

$$\sigma_y^2(k)=\lambda \cdot \sigma_y^2(k-1)+(1-\lambda)\cdot(y(k)-\mu_y(k))^2$$

wherein $\lambda$ is a forgetting factor of an exponential forgetting;
wherein $\sigma_y^2(k-1)$ is the variance of controller error at previous sample; and wherein $\mu_y(k)$ is arithmetic mean value computed recursively as follows:

$$\mu_y(k)=\lambda \cdot \mu_y(k-1)+(1-\lambda)\cdot y(k).$$

8. The heating, ventilation, and air conditioning system of claim 1, wherein the computer processor is operable to subtract the ratio from a value of 1, such that a poor performance value for the process controller has a value close to 1.

9. A heating, ventilation, and air conditioning system comprising:
a computer processor operable to rate a process controller by:
calculating a variance of a prediction error of a naïve predictor model;
calculating a variance of a controller error;
calculating a ratio of the variance of the controller error and the variance of the prediction error of the naïve predictor model;
rating the process controller as a function of the ratio; and
comparing ratings of controllers in order to prioritize loops to maintain and trigger an automated tuning mechanism.

10. The heating, ventilation, and air conditioning system of claim 9, wherein the variance of the prediction error of the naïve predictor model comprises:

$$\sigma_{NP}^2 = \frac{1}{N-1}\sum_{k=1}^{N}(y(k)-y(k-1))^2$$

wherein N is a number of process variable samples; and
wherein y(k) is a control error value, wherein the control error value is determined by subtracting a process variable from a setpoint.

11. The heating, ventilation, and air conditioning system of claim 9, wherein the variance of the prediction error of the naïve predictor model is calculated recursively as follows:

$$\sigma_{NP}^2(k)=\lambda \cdot \sigma_{NP}^2(k-1)+(1-\lambda)\cdot(y(k)-y(k-1))^2$$

wherein $\lambda$ is a forgetting factor of an exponential forgetting; and
wherein $\sigma_{NP}^2(k-1)$ is the variance of the prediction error of the naïve predictor model at previous sample.

12. The heating, ventilation, and air conditioning system of claim 9, wherein the variance of the controller error comprises:

$$\sigma_y^2 = \text{var}(y) = \frac{1}{N-1}\sum_{k=1}^{N}(y(k)-\mu_y)^2$$

wherein N is a number of process variable samples;
wherein y(k) is a control error value, wherein the control error value is determined by subtracting a process variable from a setpoint; and
wherein $\mu_y$ is a arithmetic mean value of the control error, $$\mu_y = \frac{1}{N}\sum_{k=1}^{N}y(k).$$

13. The heating, ventilation, and air conditioning system of claim 9, wherein the variance of the controller error is computed recursively as follows:

$$\sigma_y^2(k)=\lambda \cdot \sigma_y^2(k-1)+(1-\lambda)\cdot(y(k)-\mu_y(k))^2$$

wherein $\lambda$ is a forgetting factor of an exponential forgetting;

wherein $\sigma_y^2(k-1)$ is the variance of controller error at previous sample; and wherein $\mu_y(k)$ is an arithmetic mean value computed recursively as follows:

$$\mu_y(k)=\lambda \cdot \mu_y(k-1)+(1-\lambda)\cdot y(k).$$

14. The heating, ventilation, and air conditioning system of claim 9, wherein the computer processor is operable to subtract the ratio from a value of 1, such that a poor performance value for the process controller has a value close to 1.

* * * * *